United States Patent
Chmelir et al.

(10) Patent No.: US 6,552,141 B1
(45) Date of Patent: Apr. 22, 2003

(54) METHOD FOR PRODUCING SYNTHETIC POLYMERIZATES WITH VERY LOW RESIDUAL MONOMER CONTENT

(75) Inventors: Miroslav Chmelir, Krefeld (DE); Kurt Dahmen, Moenchengladbach (DE)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 09/554,098

(22) PCT Filed: Nov. 13, 1998

(86) PCT No.: PCT/EP98/07289

§ 371 (c)(1), (2), (4) Date: Jun. 14, 2000

(87) PCT Pub. No.: WO99/26987

PCT Pub. Date: Jun. 3, 1999

(30) Foreign Application Priority Data

Nov. 25, 1997 (DE) .......................... 197 52 127

(51) Int. Cl.[7] .................. C08J 4/00; C08J 120/06
(52) U.S. Cl. ............... 526/217; 526/83; 526/180; 526/220; 526/303.1; 526/317.1; 526/318.44; 526/329.2; 526/264; 526/271
(58) Field of Search ............... 526/303.1, 317.1, 526/83, 180, 217, 220, 319, 240, 318.44, 329.2, 264

(56) References Cited

U.S. PATENT DOCUMENTS

| | | | | |
|---|---|---|---|---|
| 4,766,173 A | * | 8/1988 | Bailey et al. | 524/819 |
| 4,929,717 A | * | 5/1990 | Chmelir | 528/490 |
| 4,954,562 A | * | 9/1990 | Anderson | 524/430 |
| 4,985,518 A | * | 1/1991 | Alexander et al. | 526/240 |
| 5,264,471 A | * | 11/1993 | Chmelir | 524/35 |
| 5,684,106 A | * | 11/1997 | Johnson et al. | 526/295 |

FOREIGN PATENT DOCUMENTS

| | | |
|---|---|---|
| DE | 19529348 A | 2/1997 |
| EP | 0505163 A | 9/1992 |

* cited by examiner

Primary Examiner—J. Zalukaeva
(74) Attorney, Agent, or Firm—Oblon, Spivak, McClelland, Maier & Neustadt, P.C.

(57) ABSTRACT

The invention relates to a method for producing water-soluble or water-swellable polymerizates with a low residual monomer content from acrylic acid and/or acrylic acid derivatives. The method is characterized by the addition of a nitrogen compound to the monomer solution to be polymerized, an in that the polymerizate is subsequently heated at temperature of 120 to 240° C. The polymerizates produced according to the inventive method are suitable as flocculants, dispersants and absorbers.

19 Claims, No Drawings

METHOD FOR PRODUCING SYNTHETIC POLYMERIZATES WITH VERY LOW RESIDUAL MONOMER CONTENT

The invention relates to a process for producing synthetic polymers based on acrylic acid and derivatives thereof, which polymers have an exceedingly low content of residual monomers. The polymers have high molecular weights and either are water-soluble or have high absorptive capacity for water, aqueous solutions and body fluids.

Various synthetic polymer products having absorptive capacity for water and body fluids have been described in numerous patents: e.g. crosslinked polymers and copolymers based on acrylic or methacrylic acid (U.S. Pat. No. 4,018,951, U.S. Pat. No. 4,066,583, U.S. Pat. No. 4,062,817, U.S. Pat. No. 4,066,583, DE-OS 26 13 135, DE 27 12 043, DE. 28 13 634), or acrylamidopropanesulfonic acid copolymers (DE 31 24 008). These absorbents are virtually insoluble in water, absorbing a multiple of their weight of water, urine or other aqueous solutions at equilibrium. In addition to high absorptive capacity, other properties of synthetic absorbents such as low residual monomer content, low ratio of water solubles and high gel strength of the swollen polymer particles are also mentioned in some patent specifications.

In the production of high molecular weight water-soluble or water-swellable, i.e., partially crosslinked polymers and mixed polymers, complete conversion of the monomers—in particular, monomers based on acrylic acid—has been found impossible. On an industrial scale, residual monomer levels of from 0.1 to 0.5 wt.-% normally are observed in the polymer product.

The toxicity of the monomers remaining in the polymer product is well-known and therefore, a process for producing polymers and mixed polymers virtually free of monomers would be highly convenient. Up to now, since it has not been possible as yet to conduct a polymerization process in such a way that virtually no residual monomers would remain, it has been attempted to remove the toxic residual monomers from the polymer product by converting them into harmless derivatives. Thus, DE-AS 1,070,377 and U.S. Pat. No. 2,960,486, use mixing the aqueous solutions of high molecular weight acrylamide polymers with sodium disulfite solution and drying at 80–120°. One precondition for these methods is processing the polymer product in a highly diluted (2–3%) polymer solution, which is uneconomic, and for this reason these methods have rarely been applied in practice.

The treatment of a polymer gel with an aqueous solution of sodium bisulfite or metabisulfite has been described in U.S. Pat. No. 3,755,280, and with a solid alkali sulfite in EP 175,554, where residual monomer contents of from 0.03 to 0.3 wt.-% have been obtained. Likewise, the JP-PS 56/103207 uses bisulfites, sulfites and pyrobsulfites for the same purpose. U.S. Pat. No. 3,780,006 uses gaseous sulfurdioxide in order to decrease the acrylamide concentration in an emulsion polymer. EP 505,163 uses treatment of polymer products with a combination of metabisulfite and a surface-active agent (HLB from 3 to 40) subsequent to completed polymerization, thereby decreasing the residual monomer content down to 10 ppm. From 2 to 5 wt.-% of metabisulfite (relative to the polymer gel having 40% w.s., that is, from 5 to 12.5 wt.-% of metabisulfite relative to the dry polymer product) is necessary in such a secondary treatment of polymer gels in order to achieve the desired decrease in residual monomers. Such high quantities of added substances may have highly negative effects on the application-technical properties.

EP 303,518A2 describes a process for producing absorbent polymer products based on acrylic acid/acrylamide, and according to this invention, a high degree of neutralization of from 70 to 100 mole-%, a high monomer concentration of at least 50%, and a combination of thermally decomposing azo and redox initiators are used. Owing to these conditions, the reaction proceeds in such a way that all of the water used in the batch undergoes vaporization even during the polymerization, so that subsequent drying can be omitted, and the residual monomer contents are said to drop below 500 ppm, preferably below 200 ppm. The residual monomer levels of the experimental examples have not been specified.

DE 37 24 709 A1 describes a process for producing polymer products having low residual monomer content, wherein the polymer products following production are reacted in a swollen form as a gel or in solution with compounds reacting with the double bonds in the residual monomers at 50–150° C.

In U.S. Pat. No. 4,766,173, the decrease of acrylic acid residual monomer in polymer products is effected by subsequent treatment of the polymer products using amino acids of the lysine and cysteine types at temperatures from 80° C. on.

WO 94/20547 describes additives such as bromate and chlorate in the polymerization solution and subsequent heating of the final polymer wherein, inter alia, a decrease of the residual monomers is effected by the additives. The bromates and chlorates may also be added subsequent to the polymerization. Despite these measures, the residual monomer content of the polymer products is between about 135 and 1100 ppm.

While the prior art processes described above permit a substantial decrease of residual monomers, they involve several drawbacks such as malodors as a result of liberated sulfur dioxide, corrosion of the plant by sulfur oxide resultant products (e.g. sulfurous acid and sulfuric acid as well as salts thereof in acidic medium). Above all, however, any subsequent treatment of the final polymer that has been produced represents an additional technological step necessitating additional apparatus and a quite considerable input of time, and also, a quite significant amount of additive remains, in the final product and may adversely affect the application-technical properties.

It is therefore the object of the invention to produce synthetic polymer products of per se known chemical composition with high molecular weight or high retention capability for water,; aqueous liquids and body fluids, using particular specific conditions so as to obtain final products having an extremely low residual monomer content and good application-technical properties, without necessitating a subsequent treatment of the produced polymers using additional chemical compounds.

Surprisingly, it has now been found that synthetic polymer products based on acrylic acid and having the desired properties and an extremely low content of residual monomers can be produced by free-radical polymerization in aqueous solution, provided a salt of at least one nitrogen compound is used during the preparation of the monomer mixture to be polymerized, and the polymer products are subjected to subsequent heating at 120 to 240° C., preferably 140 to 180° C. The polymer products according to the process of the invention have an extremely low content of residual monomers, preferably being below 50 ppm, particularly below 30 ppm. Of special importance is the fact that acrylamide, which is rated critical in toxicological terms, can be decreased to a residual content of below 10 ppm.

Predominantly, the salts of ammonia, hydroxylamine, of aliphatic mono- and polyamines, particularly aliphatic $C_1$–$C_{10}$ amines, cycloaliphatic mono- and polyamines, particularly cycloaliphatic $C_6$–$C_{12}$ amines, aromatic mono- and polyamines, particularly aromatic $C_6$–$C_{12}$ amines, heterocyclic amines, and alkanolamines and mixtures thereof can be used as suitable salts of nitrogen compounds. In particular, the salts of ammonia, monoethanolamine and diethanolamine are preferably used.

Inorganic and organic acids are suitable as salt-forming acidic component of the amine salts to be used according to the invention. As inorganic acids, in particular, hydrofluoric acid, hydrochloric acid, hydrobromic acid and hydriodic acid, sulfuric acid, sulfurous acid, sulfoxylic acid, orthophosphoric acid, phosphorous acid, nitric acid, and nitrous acid form the counterion. Organic acids can be derived from aliphatic, aromatic and mixed aliphatic/aromatic compounds. They preferably contain a carboxyl group and/or acid functions formed by sulfur or phosphorus and also, multiple acid groups may be present in one molecule. Likewise, the anhydrides of these acids can be employed. From the group of aromatic acids, benzoic acid, phthalic acids, o-, m- and p-toluenesulfonic acids, toluenesulfinic acid, styrenesulfonic acid, 2-hydroxy-2-phenyl-ethane-1-sulfonic acid may be mentioned as examples, and formic acid, acetic acid, propionic acid, butyric acid, hydroxypropionic acid, (meth)acrylic acid, vinylacetic acid, crotonic acid, maleic acid, fumaric acid, acrylamidopropanesulfonic acid, lactic acid, oxalic acid, malonic acid, succinic acid, tartaric acid, glutaric acid, and aspartic acid from the group of aliphatic acids.

The employed concentrations of the nitrogen compound salts preferably range from 2 to 35 wt.-%, more preferably between 5 and 20 wt.-%, relative to the monomer solution.

The amine salts of the invention may also be mixtures of amine salts with various acid counterions as mentioned above.

In order to achieve an economic production of the polymers, the polymerization is carried out using initiators which decompose at relatively low temperatures. Inorganic or organic peroxides or redox systems are used as common initiators. When polymerizing in aqueous phase, inorganic peroxides- such as peroxodisulfates are frequently used alone or in combination with a reducing component.

The polymerization can be initiated using a redox initiator system or by means of photopolymerization. The redox initiator system mostly consists of two components, i.e., an inorganic or organic peroxide-containing compound and a reducing component such as sulfite, hydrosulfite, thiosulfate, sulfinic acid, ascorbic acid and their copper, ferrous or manganese salts. Alkali metal or ammonium peroxides such as potassium peroxodisulfate and hydrogen peroxide can be used as inorganic peroxide compounds, and benzoyl peroxide, butyl hydroperoxide as organic peroxides. In general, the polymerization is initiated using a redox initiator system. Other initiators may be used in addition to such an initiator system. In the case of photopolymerization which can be initiated by UV-containing light, socalled photoinitiators like e.g. benzoin or benzoin derivatives such as benzoin ethers, benzil and derivatives thereof such as benzil ketals acrylic diazonium salts, azo initiators such as 2,2'-azobisisobutyronitrile, 2,2'-azobis(2-amidinopropane) hydrochloride or acetophenone derivatives are used. The amounts of peroxide-containing component and reducing component may range from 0.0005 to 0.5 wt.-%, preferably from 0.001 to 0.1 wt.-% (relative to the monomer solution), and the amounts of photoinitiators may range from 0.001 to 0.1 wt.-%, preferably from 0.002 to 0.05 wt.-% (relative to the monomer solution).

Predominantly, possible monomers are acrylic acid, acrylamide, methacrylic acid, and methacrylamide, which are polymerized to form homopolymers or mixed polymers, but also other monomers such as acrylonitrile, methacrylonitrile, N,N-dimethylacrylamide, vinylpyrrolidone, vinylpyridine, vinyl acetate, as well as other water-soluble polymerizable acids and salts thereof, particularly maleic, fumaric, itaconic, vinylsulfonic, or acrylamidomethylpropanesulfonic acid; also, hydroxy group-containing esters of polymerizable acids, particularly the hydroxyethyl and hydroxypropyl esters of acrylic and methacrylic acid can be used; furthermore, amino group-containing and ammonium group-containing esters and amides of polymerizable acids, such as dialkylamino esters, particularly the dimethyl and diethylaminoalkyl esters of acrylic and methacrylic acid, as well as trimethyl and trimethylammoniumalkyl esters and the corresponding amides. The above monomers can be polymerized alone to form homopolymers or mixed with each other to form mixed polymers. In addition, small amounts of water-insoluble monomers can be copolymerized with the above monomers, e.g. esters of acrylic and/or methacrylic acid with $C_1$–$C_{10}$ alcohols, styrene and alkylated styrenes. In general, the proportion of water-soluble monomers is from 60 to 100 wt.-%, relative to the overall monomers. As a rule, the water-insoluble (hydrophobic) monomers make up for 0 to 40 wt.-% of the monomers.

The acidic monomer components can be neutralized prior to polymerizing, where the neutralization level preferably is between 10 and 100 mole-%, particularly between 50 and 90 mole-%. All common inorganic and organic compounds are possible as bases for neutralization and, in particular, sodium hydroxide solution, potassium hydroxide solution, ammonia (ammonium hydroxide), alkanolamines, and alkylamines as well as mixtures thereof are preferred. Also, the use of bases of multivalent metal ions, such as calcium hydroxide, is possible within certain limits, but care has to be taken not to involuntarily change essential polymer properties such as solubility or absorptive capacity.

Small amounts of crosslinking monomers, e.g. monomers having more than one reactive group in their molecule can be polymerized together with the above-mentioned monomers, thereby forming partially crosslinked polymer products which are no longer soluble in water but merely swellable. Bi- or multifunctional monomers, e.g. amides such as methylenebisacrylamide or -methacrylamide or ethylenebisacrylamide, and also, esters of polyols and alkoxylated polyols, such as diacrylates or triacrylates, e.g. butanediol or ethylene glycol diacrylate, polyglycol di-(meth)acrylates, trimethylolpropane triacrylate, di- and triacrylate esters of trimethylolpropane preferably oxyalkylated (ethoxylated) with 1 to 30 mol alkylene oxide, acrylate and methacrylate esters of glycerol and pentaerythritol, or of glycerol and pentaerythritol preferably oxyethylated with 1 to 30 mol ethylene oxide, and also, allyl compounds such as allyl (meth)acrylate, alkoxylated allyl (meth)acrylate preferably reacted with 1 to 30 mol ethylene oxide, triallyl cyanurate, diallyl maleate, polyallyl esters, tetraallyloxyethane, triallylamine, tetraallylethylenediamine, allyl esters of phosphoric acid or phosphorous acid, and crosslinkable monomers such as N-methylol compounds of amides such as methacrylamide or acrylamide and ethers derived therefrom may be mentioned as crosslinking monomers. The ratio of crosslinking monomers is from 0 to 10 wt.-%, preferably from 0.01 to 3.0 wt.-%, relative to the overall monomers.

The water-absorbing polymeric absorbents are obtained using at least one crosslinker. As crosslinkers, those compounds are used which contain at least 2 or more functional groups (double bonds, epoxy groups) and are capable of being incorporated into the growing polymer chains during polymerization. As a result, crosslinking sites are formed at various positions in the polymer product, which hold together the individual polymer chains, taking such an effect that the polymer particles can merely swell in a liquid and will not dissolve in said liquid. The properties of the crosslinked polymer are determined by the chemical structure of the crosslinker, the number of crosslinking sites, but also, by their distribution in the polymer chains. In case of optimum incorporation of crosslinker into the polymer, crosslinked polymer products will be formed having their crosslinking sites uniformly distributed, so that non-crosslinked regions or even non-crosslinked (i.e., water-soluble) low molecular weight components are barely present in the polymer product. Uniform distribution of the crosslinking sites within the polymer results in a product which also has optimum retention capability for aqueous liquids and optimum gel strength in the swollen state.

The polymerization preferably is performed in aqueous solution, batchwise in a polymerization vessel or continuously on a continuous belt, e.g. according to DE 35 44 770. Given a virtually adiabatic course of polymerization, an aqueous polymer gel is formed at a corresponding initial concentration of from 15 to 50 wt.-% of monomers. By selecting the initial monomer concentration and an appropriate low initial temperature ranging from 0 to 50° C., preferably from 5 to 25° C., it is possible to conduct the polymerization in such a way that the maximum temperature in the aqueous polymer gel being formed can easily be controlled.

According to the process of the invention, the produced polymer is heated at a temperature of 120–240° C., preferably 140–180° C. in order to achieve said low residual monomer content. Care must be taken not to deteriorate other essential properties of the polymer product by an excessively high temperature or long time. The optimum time required for heating depends on the nitrogen compound concentration and temperature level and can be determined using just a few experiments. In most of the cases, a time period between 10 minutes and 2 hours is sufficient, preferably between 10 minutes and 1 hour.

The polymer products are classified in screen fractions required for various applications. For example, when using the crosslinked polymer products as absorbents in the hygiene sector, grain size distributions of from 0.2 to 1 mm are preferred, products ranging from 0.2 to 3 mm are preferably used in the agricultural sector, and products ranging from 0.1 to 1.2 mm for soluble polymers in the flocculant sector.

As a result of the low content of residual monomers, the polymer products according to the invention have the following advantages over well-known polymers produced according to prior art:

1. The polymer products can be used in manufacturing absorbent materials where an extremely low content of residual monomers is demanded for toxicological reasons, e.g. in superabsorbers for the hygiene industry (diapers, incontinence products), food industry (packagings), in soil improvers, etc.
2. The polymer products can also be used in the controlled release of other substances subsequently incorporated in the polymer or contained in the polymer to other bodies, e.g. in dosing drugs in human medicine, in dosing nutrients (fertilizer effect) to plants, insecticides and herbicides in aqueous media, preferably on large water surfaces, with no major quantities of toxicologically critical residual monomers invading the environment.
3. Non-crosslinked, water-soluble polymer products having low residual monomer content may also be used in such applications where low residual monomer levels are demanded for toxicological reasons, e.g. in drinking water treatment, when used as thickening agents in the food industry, in dosing of drugs, etc.

The incorporation of nutrients for plants, of herbicides, insecticides, disinfectants, drugs, antibacterial agents and other substances into the polymer product can be effected by directly adding these compounds to the monomer solution as long as the course of polymerization is not perturbed thereby. However, in case these substances do have an impact on the polymerization, their incorporation has to be effected not before during polymerization or after completed polymerization by including these substances in the ready-produced polymer gel according to e.g. DE 40 29 591, DE 40 29 592 or DE 40 29 593.

EXAMPLES

Absorptive Capacity Determination 1 g of polymer is added with stirring to a 250 ml beaker containing 200 ml of Fertilizer solution*. Following a stirring period of 15 minutes, the magnetic stirrer is turned off, and this is allowed to stand for 45 minutes. The content of the beaker then is poured over a screen having a mesh width of 0.3 mm, where the polymer swollen by the fertilizer solution remains on the screen. The amount of fertilizer solution absorbed by the polymer is calculated in ml/g of polymer from the difference between the 200 ml amount of solution originally employed and the amount of solution having passed the screen.

*Peters® Professional Fertilizer, Grace-Sierra Horticultural Products Comp., Pennsylvania, USA.

Determination of the Residual Monomer Content

The residual monomer components acrylamide and acrylic acid are determined in aqueous extracts of the polymers using HPLC with internal standards.

Example 1

Initially, 146.5 g of acrylic acid, 372 g of acrylamide solution (40 wt.-%), 6.9 g of acrylamidopropanesulfonic acid and 0.9 g of methylenebisacrylamide in 230 g of water were neutralized in a polymerization vessel with 180 g of potassium hydroxide solution (45%) to a neutralization level of 70%. Following addition of 59.3 g of ammonium chloride, the monomer solution was cooled to 10° C. and purged with nitrogen. Following addition of the initiator solutions (1.0 g of sodium peroxodisulfate, 0.2 g of 2,2'-azobis(2-methylpropionamidine) dihydrochloride, each in 20 ml of water, and 0.05 g of Irgacure® 651 (photoinitiator, Ciba Geigy Company) in 2 g of acrylic acid), the polymerization was initiated using UV light. The maximum temperature of 104° C. was reached within 6 minutes. After completed polymerization, the polymer was heated at 160° C. for 1.5 hours, milled, and screened for the desired grain fraction of 200–1000 μm. The absorptive capacity for a 0.1% fertilizer solution was 74 ml/g, and the residual monomer content was 10 ppm of acrylic acid and 5 ppm of acrylamide.

Example 2

The monomer solution according to Example 1 was neutralized with 180 g of potassium hydroxide solution (45%) to a neutralization level of 70%. Following addition of 89 g of ammonium chloride, the monomer solution was cooled to 10° C. and purged with nitrogen. Following addition of the initiator solutions according to Example 1, the polymerization was initiated using UV light. The maximum temperature of 104° C. was reached within 8 minutes. After completed polymerization, the polymer was heated at 160° C. for 1.5 hours and milled to the desired grain fraction. The absorptive capacity for a 0.1% fertilizer solution was 67 ml/g, and the residual monomer content was 10 ppm of acrylic acid and 5 ppm of acrylamide.

Example 3

155 g of water was mixed with 742 g of acrylamide solution (40 wt.-%) in a polymerization vessel. Following addition of 0.34 g of diethylenetriaminepentaacetic acid sodium salt (40%) and 59.3 g of ammonium chloride, the monomer solution was cooled to 5° C. and purged with nitrogen. Following addition of the initiator solutions (1.0 g of sodium peroxodisulfate, 0.2 g of 2,2'-azobis(2-methylpropionamidine) dihydrochloride, each in 20 ml of water, and 0.05 g of Irgacure® 651 (photoinitiator, Ciba Geigy Company) in 2 g of acrylic acid), the polymerization was initiated using UV light. The maximum temperature of 102° C. was reached within 10 minutes. After completed polymerization, the polymer was heated at 140° C. for 1.5 hours, milled, and screened for the desired grain fraction of 200–1000 μm. The residual monomer content was 3 ppm of acrylic acid and 10 ppm of acrylamide.

What is claimed is:

1. A process for producing a water-soluble or water-swellable polymer or copolymer comprising, providing an acid monomer or monomers alone, or with a comonomer or comonomers; mixing said monomer or monomers with a nitrogen salt compound or compounds selected from the group consisting of amine salts of hydrofluoric acid, hydrochloric acid, hydrobromic acid, hydriodic acid, sulfuric acid, sulfurous acid, sulfoxylic acid, thiophosphoric acid, phosphorous acid, nitric acid and nitrous acid, amine salts of organic acids, hydroxylamine salts, alkanolamine salts, alkylamine salts and mixtures thereof;

free-radical polymerizing said monomer or monomers alone, or with a comonomer or comonomers to form said water-soluble or water-swellable polymer or copolymer; and subsequently heating said water-soluble or water-swellable polymer or copolymer at a temperature of from 120 to 240° C.

2. The process according to claim 1, wherein said nitrogen salt compound or compounds are selected from the group consisting of amine salts of hydrofluoric acid, hydrochloric acid, hydrobromic acid, hydriodic acid, sulfuric acid, sulfurous acid, sulfoxylic acid, thiophosphoric acid, phosphorous acid, nitric acid and nitrous acid, amine salts of organic acids, monoethanolamine salts or diethanolamine salts and mixtures thereof.

3. The process according to claim 1, wherein said nitrogen salt compound or compounds are in an amount from 2 to 35.0 wt.-% relative to the monomer solution.

4. The process according to claim 1, wherein said nitrogen salt compound or compounds are in an amount from 5 to 20 wt.-% relative to the monomer solution.

5. The process according to claim 1, wherein said monomer or monomers are selected from the group consisting of acrylic acid, methacrylic acid and derivatives thereof.

6. The method of claim 1, wherein said comonomer is vinyl acetate.

7. The process according to claim 1, wherein at least one crosslinker based on a bi- or polyfunctional monomer is used in addition to said monomer or monomers.

8. The process according to claim 1, wherein the polymer produced is heated at a temperature of from 140 to 180° C.

9. The process according to claim 1, wherein polymer products having a content of residual monomer of less than 50 ppm are formed.

10. The process according to claim 1, wherein polymer products having a content of residual monomer of less than 30 ppm are formed.

11. The process according to claim 1, wherein polymer products having a residual content of acrylamide of less than 10 ppm are formed.

12. The process according to claim 1, wherein said nitrogen salt compound or compounds are selected from the group consisting of amine salts of hydrofluoric acid, hydrochloric acid, hydrobromic acid, hydriodic acid, sulfuric acid, sulfurous acid, sulfoxylic acid, thiophosphoric acid, phosphorous acid, nitric acid and nitrous acid, amine salts of organic acids, aliphatic mono- and polyamine salts, cycloaliphatic mono- and polyamine slats, aromatic mono- and polyamine salts, heterocyclic amine salts, hydroxylamine salts and alkanolamine salts.

13. The process according to claim 1, wherein said monomer or monomers are acrylic acid, methacrylic acid, maleic acid, fumaric acid, itaconic acid, vinyl sulfonic acid or acrylamidopropanesulfonic acid.

14. The process according to claim 1, wherein said comonomer or comonomers are acrylonitrile, methacrylonitrile, N,N-dimethylacryl amide, vinylpyrrolidone, vinylpyridine, vinyl acetate, hydroxy group-containing esters of polymerizable acids, amino group-containing and ammonium group-containing esters and amides of polymerizable acids, $C_1$–$C_{10}$ alcohol esters of acrylic and/or methacrylic acid or esters of acrylic and/or methacrylic acid with styrene or alkylated styrene.

15. The process according to claim 1, wherein said heating is carried out for a time period between 10 minutes and 2 hours.

16. The process according to claim 8, wherein said heating is carried out for a time period between 10 minutes and 1 hour.

17. The process according to claim 1, wherein said heating is carried out for a time period between 10 minutes and 1 hour.

18. The process according to claim 8, wherein said heating is carried out for a time period between 10 minutes and 2 hours.

19. The process according to claim 1, wherein said monomer or monomers are neutralized with an organic or inorganic base compound up to a neutralization level of from 10 to 100%.

* * * * *